Oct. 14, 1941.　　　J. P. BURKE　　　2,258,845

CLIP NUT

Filed Dec. 29, 1939

INVENTOR.
James P. Burke
BY
ATTORNEY.

Patented Oct. 14, 1941

2,258,845

UNITED STATES PATENT OFFICE 2,258,845

CLIP NUT

James P. Burke, Knoxville, Tenn., assignor to Bert L. Quarnstrom and F. L. McLaughlin, both of Detroit, Mich.

Application December 29, 1939, Serial No. 311,626

11 Claims. (Cl. 85—32)

This invention relates to nuts and has for its primary object to provide a sheet metal nut having means for retaining itself upon a supporting member, in proper position for the reception of a screw or bolt.

A more specific object is to provide a sheet metal nut of substantially U-shape, with one of the arms of the U having bolt or screw engaging means, and being insertable through an aperture adjacent a bolt hole in a supporting member in such manner that the two arms of the U engage opposite sides of the supporting members to support the nut with its bolt receiving hole in alignment with the bolt hole so that a bolt may be inserted therein.

Another object is to provide a nut of the type above mentioned having means thereon coacting with the walls of the aperture to retain the nut against accidental displacement. The means for this purpose is designed to provide a snap-action during the final stage of assembly of the nut.

Figure 1:
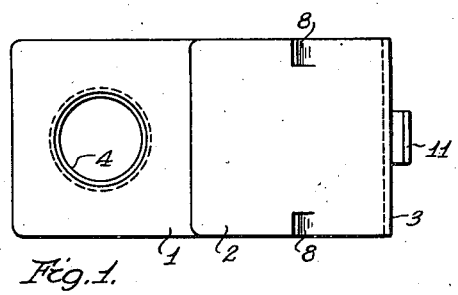
Figure 2:
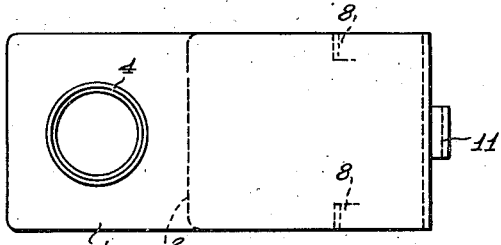
Figure 3:
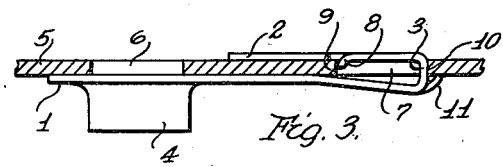
Figure 4:
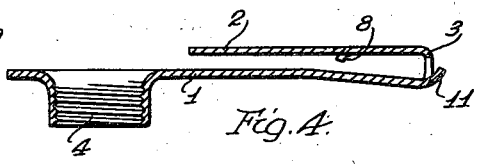
Figure 5:
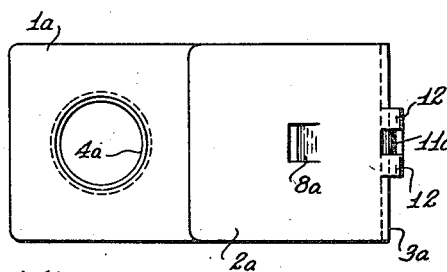
Figure 6:
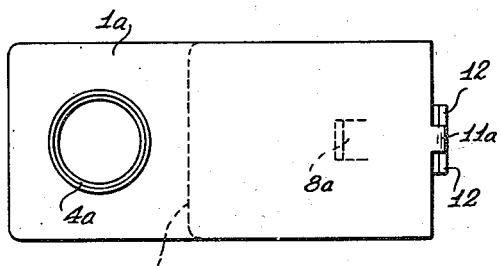
Figure 7:
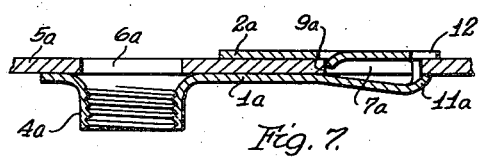
Figure 8:
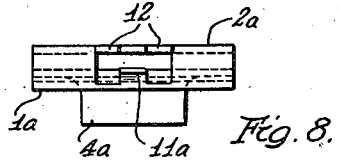
Figure 9:
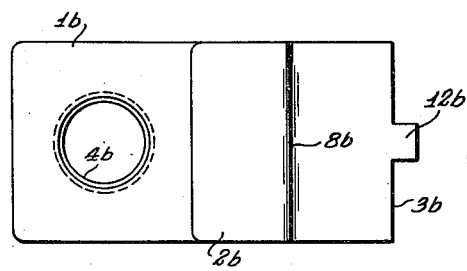
Figure 10:
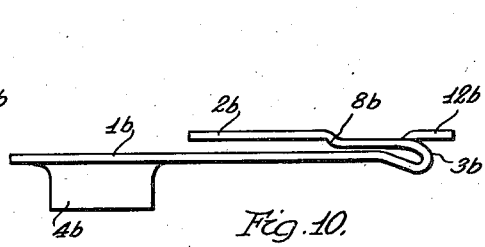
Figure 11:
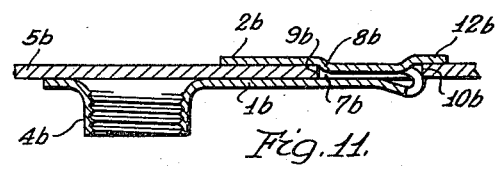

Other objects and advantages will become more fully apparent as reference is had to the accompanying drawing wherein the invention is illustrated, and in which Figs. 1 and 2 are top and bottom plan views, respectively, of a nut, Fig. 3 is a side elevation of the nut in an assembled position upon a supporting member which is shown in cross section, Fig. 4 is a longitudinal cross section of the nut, Figs. 5 and 6 are top and bottom plan views, respectively, illustrating an alternative construction, Fig. 7 is a longitudinal section of the alternative construction in assembled position upon a supporting member, Fig. 8 is an end view of the alternative construction, Fig. 9 is a plan view of a modification, Fig. 10 is a side elevation of the modification, and Fig. 11 is a longitudinal section illustrating the modification assembled upon a supporting member.

The nut shown in Figs. 1 to 4 is composed of a sheet metal strip bent into substantially U form, with the arm 1 of the U being longer than the arm 2, and the portion 3 which connects the two arms extending perpendicular to the arms so as to constitute a shoulder. The longer arm 1 has a portion thereof extruded and shaped to provide a tubular extension 4, which is internally threaded.

As shown in Fig. 3, the supporting member 5 is formed with a hole 6 through which a bolt or screw is adapted to be loosely inserted. Adjacent the hole 6 is a rectangular aperture 7, and when the nut is placed in use the longer arm 1 is inserted through the aperture so that the arms 1 and 2 may be moved into contact with upper and lower surfaces of the member 5, and the internally threaded extension 4 into alignment with the hole 6.

As the nut is moved into place as above described a pair of fingers 8, struck from the arm 2, engage the edge 9 of the aperture 7, and portion 3 engages the opposite wall 10, to hold the nut against shifting or turning around the aperture 7. To prevent accidental displacement of the nut when a screw or bolt is inserted in the portion 4 a finger 11 is struck outwardly from the juncture of the arm 1 and portion 3. During the final stage of insertion of the nut in the aperture 7 the finger snaps past the edge 10 and then springs outwardly to engage the underside of the supporting member 5.

The construction illustrated in Figs. 5 to 8 is similar to that above described, and reference characters with the suffix a added refer to the corresponding parts above described. In this form instead of providing two fingers 8, a single finger 8a is struck from the arm 2a to engage the edge 9a of the aperture 7a, and in addition to the finger 11a, which engages the bottom surface of the supporting member 5a, a pair of fingers 12 are struck from the portion 3a and contact the top surface of the supporting member 5a.

The form shown in Figs. 9, 10 and 11 is similar to those above described, and the reference characters correspond to those of the first form with the suffix b added thereto. In this form, instead of forming fingers 8 the arm 2b is bent to form a shoulder 8b which engages the edge 9b of the aperture 7b. The portion 3b is rounded so that as it snaps through the aperture it curves under the edge 10b and beneath the lower surface of the supporting member 5b. A projecting finger 12b struck from the portion 3b engages the upper surface of the supporting member 5b.

Although specific embodiments of the invention are illustrated and described, it will be understood that various changes may be made within the scope of the appended claims without departing from the spirit of the invention, and such changes are contemplated.

What is claimed is:

1. A clip nut composed of sheet metal bent into U-shape and having two substantially parallel planar arms adapted to engage opposite sides of a supporting member, one of the arms of the U being longer than the other and both being of substantially the same width, the longer arm having bolt receiving means thereon disposed outwardly from the free end of the shorter arm, said longer arm being adapted to be inserted through an aperture adjacent a bolt hole in a supporting member in such manner that the two arms have flat contact with opposite faces of the supporting member with the portion connecting the two arms extending through the aperture and the bolt receiving means aligned with the hole, and means on one of said arms comprising at least one prong struck therefrom and extending between and generally in the direction of the two arms and adapted to engage one edge of the aperture to hold said connecting portion of the U in pressure contact with an opposed edge of the aperture.

2. A clip nut composed of sheet metal bent into U-shape with one of the arms of the U longer than the other, the longer arm having bolt receiving means thereon disposed outwardly from the free end of the shorter arm, said longer arm being adapted to be inserted through an aperture adjacent a bolt hole in a supporting member in such manner that the two arms engage opposite faces of the supoprting member with the portion connecting the two arms extending through the aperture and the bolt receiving means aligned with the hole, and means on one of said arms adapted to engage one edge of the aperture to hold said connecting portion of the U in pressure contact with an opposed edge of the aperture, said connecting portion having a portion adapted to snap past the aperture edge which it engages and thereafter to spring outwardly to coact with a surface of the supporting member in preventing removal of the connecting portion from the aperture.

3. A clip nut composed of sheet metal bent into U-shape with one of the arms of the U longer than the other, the longer arm having bolt receiving means thereon disposed outwardly from the free end of the shorter arm, said longer arm being adapted to be inserted through an aperture adjacent a bolt hole in a supporting member in such manner that the two arms engage opposite faces of the supporting member with the portion connecting the two arms extending through the aperture and the bolt receiving means aligned with the hole, and means on one of said arms adapted to engage one edge of the aperture to hold said connecting portion of the U in pressure contact with an opposed edge of the aperture, said connecting portion having a finger struck therefrom adapted to snap past the aperture edge which said connecting portion engages and thereafter to spring outwardly and engage a surface of the supporting member to prevent removal of the connecting portion from the aperture.

4. A clip nut composed of sheet metal bent into U-shape with one of the arms of the U longer than the other, the longer arm having bolt receiving means thereon disposed outwardly from the free end of the shorter arm, said longer arm being adapted to be inserted through an aperture adjacent a bolt hole in a supporting member in such manner that the two arms engage opposite faces of the supporting member with the portion connecting the two arms extending through the aperture and the bolt receiving means aligned with the hole, and means on one of said arms adapted to engage one edge of the aperture to hold said connecting portion of the U in pressure contact with an opposed edge of the aperture, said connecting portion being rounded and adapted to hook under the aperture edge which it engages to prevent its removal from the aperture.

5. A clip nut composed of sheet metal bent into U-shape with one of the arms of the U longer than the other, the longer arm having bolt receiving means thereon disposed outwardly from the free end of the shorter arm, said longer arm being adapted to be inserted through an aperture adjacent a bolt hole in a supporting member in such manner that the two arms engage opposite faces of the supporting member with the portion connecting the two arms extending through the aperture and the bolt receiving means aligned with the hole, means on one of said arms adapted to engage one edge of the aperture to hold said connecting portion of the U in pressure contact with an opposed edge of the aperture, said connecting portion being rounded and adapted to hook under the aperture edge which it engages to prevent its removal from the aperture, and a finger struck from said connecting portion and adapted to engage the supporting member surface adjacent the aperture and opposite the surface under which the connecting portion hooks.

6. A clip nut composed of sheet metal bent into U-shape with one of the arms of the U longer than the other, the longer arm having bolt receiving means thereon disposed outwardly from the free end of the shorter arm, said longer arm being adapted to be inserted through an aperture adjacent a bolt hole in a supporting member in such manner that the two arms engage opposite faces of the supporting member with the portion connecting the two arms extending through the aperture and the bolt receiving means aligned with the hole, means on one of said arms adapted to engage one edge of the aperture to hold said connecting portion of the U in pressure contact with an opposed edge of the aperture, and a pair of fingers struck from said connecting portion and adapted to engage opposite faces of the supporting member to retain said connecting portion in contact with the aperture edge it engages.

7. A clip nut composed of sheet metal bent into U-shape and having two substantially parallel planar arms adapted to engage opposite sides of a supporting member, one of the arms of the U longer than the other and both being of substantially equal width, the longer arm having bolt receiving means thereon disposed outwardly from the free end of the shorter arm, said longer arm being adapted to be inserted through an aperture adjacent a bolt hole in a supporting member in such manner that the two arms have flat contact with opposite faces of the supporting member with the portion connecting the two arms extending through the aperture and the bolt receiving means aligned with the hole, and means on one of said arms adapted to engage one edge of the aperture to hold said connecting portion of the U in pressure contact with an opposed edge of the aperture, said last named means comprising a shoulder formed by bending a portion of one of said arms inwardly between the two arms.

8. A clip nut composed of sheet metal bent into U-shape and having two substantially parallel planar arms adapted to engage opposite sides of a supporting member, one of the arms of the U longer than the other and both being of substantially equal width, the longer arm having bolt receiving means thereon disposed outwardly from the free end of the shorter arm, said longer arm being adapted to be inserted through an aperture adjacent a bolt hole in a supporting member in such manner that the two arms have flat contact with opposite faces of the supporting member with the portion connecting the two arms extending through the aperture and the bolt receiving means aligned with the hole, and means on one of said arms adapted to engage one edge of the aperture to hold said connecting portion of the U in pressure contact with an opposed edge of the aperture, said last named means comprising an integral prong struck from within the marginal edges of one arm and extending inwardly between the two arms.

9. A clip nut composed of sheet metal bent into U-shape and having two substantially parallel planar arms adapted to engage opposite sides of a supporting member, one of the arms of the U longer than the other and both being of substantially equal width, the longer arm having bolt receiving means thereon disposed outwardly from the free end of the shorter arm, said longer arm being adapted to be inserted through an aperture adjacent a bolt hole in a supporting member in such manner that the two arms have flat contact with opposite faces of the supporting member with the portion connecting the two arms extending through the aperture and the bolt receiving means aligned with the hole, and means on one of said arms adapted to engage one edge of the aperture to hold said connecting portion of the U in pressure contact with an opposed edge of the aperture, said last named means comprising a pair of fingers struck from opposite marginal portions of one arm and extending inwardly between the two arms.

10. A clip nut composed of sheet metal bent into U-shape and having two substantially parallel planar arms adapted to engage opposite sides of a supporting member, one of the arms of the U longer than the other and both being of substantially equal width, the longer arm having bolt receiving means thereon disposed outwardly from the free end of the shorter arm, said bolt receiving means comprising an internally threaded tubular portion extruded from said arm, said longer arm being adapted to be inserted through an aperture adjacent a bolt hole in a supporting member in such manner that the two arms have flat contact with opposite faces of the supporting member with the portion connecting the two arms extending through the aperture and the bolt receiving means aligned with the hole, and means on one of said arms spaced from the connecting portion and adapted to engage one edge of the aperture to hold the external surface of said connecting portion of the U in pressure contact with an opposed edge of the aperture.

11. A clip nut composed of sheet metal bent into U-shape with one of the arms of the U longer than the other, the longer arm having bolt receiving means thereon disposed outwardly from the free end of the shorter arm, said longer arm being adapted to be inserted through an aperture adjacent a bolt hole in a supporting member in such manner that the two arms engage opposite faces of the supporting member with the portion connecting the two arms extending through the aperture and the bolt receiving means aligned with the hole, and means on said nut adapted to engage opposite edges of the aperture for holding the nut against accidental displacement, at least one of said means being adapted to be snapped past one edge of the aperture and thereafter to spring outwardly for locking engagement with the supporting member.

JAMES P. BURKE.